US012584433B2

(12) United States Patent
Haffner

(10) Patent No.: US 12,584,433 B2
(45) Date of Patent: Mar. 24, 2026

(54) DEFLECTOR EXHAUST NOZZLE FOR AS350/EC130 AND FOR OTHER SINGLE ENGINE HELICOPTERS

(71) Applicant: PACIFIC CROWN HELICOPTERS, Marcoola (AU)

(72) Inventor: William Haffner, Valdora (AU)

(73) Assignee: PACIFIC CROWN HELICOPTERS, Marcoola Qld (AU)

( * ) Notice: Subject to any disclaimer, the term of this patent is extended or adjusted under 35 U.S.C. 154(b) by 0 days.

(21) Appl. No.: 18/953,945

(22) Filed: Nov. 20, 2024

(65) Prior Publication Data

US 2025/0075652 A1 Mar. 6, 2025

Related U.S. Application Data

(63) Continuation of application No. 17/526,370, filed on Nov. 15, 2021, now abandoned.

(Continued)

(51) Int. Cl.
*F01N 13/10* (2010.01)
*B64C 27/04* (2006.01)
(Continued)

(52) U.S. Cl.
CPC .............. *F01N 13/10* (2013.01); *B64C 27/04* (2013.01); *B64D 33/04* (2013.01); *F01N 13/082* (2013.01); *F01N 2590/00* (2013.01)

(58) Field of Classification Search
CPC ....... B64D 33/04; F01N 13/10; F01N 13/082; F01N 2590/00
See application file for complete search history.

(56) References Cited

U.S. PATENT DOCUMENTS 2,954,185 A 9/1960 Spratt
4,662,174 A 5/1987 Toulmay
(Continued)

OTHER PUBLICATIONS

Arriel 2B-2B1 Training Manual [online] Turbomeca, Mar. 2003 [retrieved on Apr. 16, 2025]. Retrieved from the Internet: <https://www.maunaloahelicopters.edu/library/Rotorcraft_Training_Manuals/Airbus_Eurocopter_Helicopter/EC_130/ARRIEL_2B-2B1.pdf> (Year: 2003).*

(Continued)

*Primary Examiner* — Joshua D Huson
*Assistant Examiner* — Anna L. Gordon
(74) *Attorney, Agent, or Firm* — Miller Nash LLP

(57) ABSTRACT

A method of fitting a single engine helicopter having a tail boom to avoid exhaust gases at the tail boom, the single engine helicopter comprising a longitudinally centrally positioned single engine and a corresponding symmetrically positioned exhaust manifold and symmetrically positioned rear tail boom, and the method includes securing to the exhaust manifold a curved and bent deflector exhaust nozzle, the deflector exhaust nozzle configured to receive exhaust from the single engine and direct the exhaust gases away from the tail boom. A single engine helicopter includes a longitudinally centrally positioned single engine and a corresponding symmetrically positioned exhaust manifold and a symmetrically positioned rear tail boom, the helicopter having a curved and bent deflector exhaust nozzle secured to the manifold, the deflector exhaust nozzle configured to receive exhaust gases from the single engine and direct the exhaust away from the tail boom.

4 Claims, 5 Drawing Sheets

Related U.S. Application Data

(60) Provisional application No. 63/114,999, filed on Nov. 17, 2020.

(51) Int. Cl.
　　B64D 33/04　　　　(2006.01)
　　F01N 13/08　　　　(2010.01)

(56) References Cited

U.S. PATENT DOCUMENTS

| | | | |
|---|---|---|---|
| 6,055,804 A | 5/2000 | Hammond | |
| 6,123,290 A | 9/2000 | Lavergne | |
| 2008/0099276 A1 | 5/2008 | Bach | |
| 2014/0215999 A1 | 8/2014 | Pantalone et al. | |
| 2017/0121033 A1* | 5/2017 | Lamb, Jr. | B64C 27/04 |
| 2017/0175673 A1* | 6/2017 | Wellhausen | F02K 1/006 |
| 2018/0100468 A1* | 4/2018 | Sutterfield | F02K 1/82 |

OTHER PUBLICATIONS

AS365/EC155 Right Deflector Nozzle, Part No. 365A54-2048-04, https://aeroxs.com/product/deflector-nozzle-right/.

365A54-2048-05 Deflector, Nozzle Left, https://aeroval.com/ref/831496/365A54-2048-05/.

"CH 53E Super Stallion Big Helicopter in Action." YouTube, Motorizado, May 6, 2021, www.youtube.com/watch?v=LYcWqkoSW3o. Accessed Oct. 24, 2024. (Year: 2021).

"AS350 B3 Light Transport Helicopter." Air Recognition, Jun. 3, 2013, available at www.airrecognition.com/index.php?option= com_content&view=article&id=693. (Year: 2013).

Pan et al. "Effects of rotor downwash on exhaust plume flow and helicopter." Applied Thermal Engineering, Jan. 17, 2014. (Year: 2014), pp. 135-149.

"Engine Exhaust Pipes Exit the Rear Chassis of a Super Lynx 300 . . . " Getty Images, Jun. 12, 2014, available at www.gettyimages.com/detail/news-photo/engine-exhaust-pipes-exit-the-rear-chassis-of-a-super-lynx-news-photo/450486550. (Year : 2014).

Ishmael, Chris. "Why Does a Helicopter's Jet Engine Exhaust Aim Sideways?" Quora, Sep. 4, 2019, available at www.quora.com/Why-does-a-helicopter-s-jet-engine-exhaust-aim-sideways. (Year: 2019).

Milliman, John C. "First flight for H-1 turned exhaust." Navair, Jun. 17, 2004, www.navair.navy.mil/node/12276. (Year: 2004.

"Bell U H-1 F." Pima Air & Space, archived on Sep. 23, 2020 at Internet Archives, web.archive.org/web/20200923194421/https://pimaair.org/museum-aircraft/bell-uh-1 f/. (Year: 2020).

RCHeliJet (Feb. 14, 2020) Gigantic RC Helicopter Scale Model Eurocopter Calibri H120 Turbine with Amazing interior [Video]. YouTube. https://www.youtube.com/watch?v=LQtchgQAN9g (Year: 2020).

Eurocopter (2008). Eurocopter EC120B Technical Data. https://exclusiveaircraft.co.uk/sites/default/files/brochure/Eurocopter-EC120 -Brochure.pdf (Year: 2008).

Aviastar (Nov. 6, 2007). Eurocopter EC-130 1999. Internet Archives. http://www.aviastar.org/helicopters_eng/eurocopter_ec- 130.php (Year: 2007).

"Coast Guard Tests Newest Version of MH-65 Helicopter." United States Coast Guard, Oct. 29, 2015, available at www .dcms. uscg. mi l/Our-Organization/ Assistant-Commandant-for-Acqu isi tions-CG-9/N ewsroom/Latest-Acq u isition-News/ Article/ 1633921/coast-guard-tests-newest-version-of-mh-65-helicopter (Year: 2015).

* cited by examiner 373 mm long 326 mm high

105

SIDE VIEW 448 mm width

105

REAR VIEW

105

FRONT VIEW

DEFLECTOR EXHAUST NOZZLE FOR AS350/EC130 AND FOR OTHER SINGLE ENGINE HELICOPTERS

RELATED APPLICATION

This application is a Continuation of U.S. Non-provisional patent application Ser. No. 17/526,370, filed Nov. 15, 2021, which claims priority to and the benefit of U.S. Provisional Application No. 63/114,999, filed Nov. 17, 2020, which is incorporated herein by reference in its entirety.

FIELD OF THE INVENTION

Disclosed are methods for fitting the exhaust manifolds of single engine helicopters with a curved and bent deflector exhaust nozzle, and such fitted single engine helicopters.

BACKGROUND

Twin engine helicopters include two engines, each positioned on either side of the helicopter. An exhaust manifold is incorporated onto each of the two engines. Fitted and secured to each of the exhaust manifolds is an exhaust nozzle. In a twin engine helicopter exhaust system, because the exhaust leaves the exhaust nozzles from the sides of the helicopter, exhaust gases are naturally diverted away from the tail boom of the helicopter.

SUMMARY

In a single engine helicopter, the single engine is longitudinally centrally positioned. That is, it is neither to one side nor the other side of the aircraft. Accordingly, as the hot exhaust gases pass from the single engine through the manifold and then through the exhaust nozzle, the exhaust gases are directed toward the tail boom of the helicopter.

During the operation of the Airbus (former Eurocopter) AS350 and EC130 series rotorcraft (helicopter), and many other single engine helicopters, exhaust gases from the single turbine engine exit rearward directly above the tail boom. FIG. 1 shows a prior art straight nozzle 101 installed on such a helicopter 103. As a result of the hot exhaust gases exiting rearward directly above the tail boom and the resultant downwash caused by the main rotor blades during flight, these exhaust gases are directed downward onto the tail boom which in turn results in the permanent damage to the tail boom.

Exhaust gases have a high temperature, that is, substantially higher than the ambient temperature. As discussed above, as the exhaust gases from a single engine helicopter pass the tail boom, high temperature related consequences occur. The result of directing exhaust gases toward the tail boom is problematic in at least several respects. For example, the durability of the rail-rotor drive shaft bearings is compromised. Also, a result is discolouration of the helicopter's exterior paint wherein the durability of painted surfaces of the tail boom is compromised. Additionally, there is an onset of structural corrosion and the premature wear of the rear tail rotor drive shaft bearings caused by overheating. Such overheating consequences could be detrimentally permanent.

In response, single engine helicopter parts suppliers recommend, for example, a heat shield to protect the parts, the structure and the surface of a single engine helicopter tail boom. A heat shield, for example, may be in the form of a thermal blanket. Another type of heat shield is a canopy cover. Alternatively, especially for military helicopters, exhaust cooling systems are incorporated to reduce infrared signatures of exhaust gases. However, in each of these solutions, the exhaust gases are still directed to the single engine helicopter tail boom.

It would be beneficial to avoid the impact of the exhaust gases on the tail boom. Thermal blankets, canopy covers, and exhaust cooling systems do not avoid the effects of exhaust gases or fumes on the tail boom. These attempts to patch up the effects of hot gases directed to the tail boom may reduce the effects, but they do not eliminate them. Such patch work compensatory fittings require engineering resources to determine and fit. A manner in which to avoid hot gases reaching the tail boom without relying on engineered compensation beneficially would accomplish avoidance of damage to the tail boom while limiting engineering investment. As each single engine helicopter design is different from the other, the solution for avoiding exhaust gases damage to the tail boom preferably does not create a new engineering problem for each different single engine helicopter design.

To ameliorate the above discussed issues, the instant disclosure is provided to explain in an enabling fashion the best modes of making and using various embodiments. The disclosure is further offered to enhance an understanding and appreciation for the solution principles and advantages thereof, rather than to limit in any manner the invention. While the preferred embodiments are illustrated and described here, it is clear that the solution is not so limited. Numerous modifications, changes, variations, substitutions, and equivalents will occur to those skilled in the art without departing from the spirit and scope of the disclosure as defined by the following claims.

It is understood that the use of relational terms, if any, such as first and second, up and down, and the like are used solely to distinguish one from another entity or action without necessarily requiring or implying any actual such relationship or order between such entities or actions.

Disclosed are methods of fitting a single engine helicopter and single engine helicopters including securing to the exhaust manifold a curved and bent deflector exhaust nozzle, the deflector exhaust nozzle configured to receive exhaust gases from the single engine and direct the exhaust gases away from the tail boom.

Disclosed is a single engine helicopter and method of fitting a single engine helicopter having a tail boom with one of a repurposed deflector exhaust nozzle certified for use on either side of twin engine helicopters. To avoid exhaust gases at the tail boom a single engine helicopter having a longitudinally centrally positioned single engine and a corresponding symmetrically positioned exhaust manifold and symmetrically positioned rear tail boom, the method includes securing to the exhaust manifold a curved and bent deflector exhaust nozzle, the deflector exhaust nozzle configured to receive exhaust from the single engine. By virtue of its curved and bent configuration, the disclosed deflector exhaust nozzle at least reduces damage typically caused to the tail boom when a standard straight exhaust nozzle is fitted which otherwise causes the exhaust gases to commingle with the downdraft air current generated by main rotor blades 106 downward onto the tail boom in flight.

DETAILED DESCRIPTION

Figure 1:
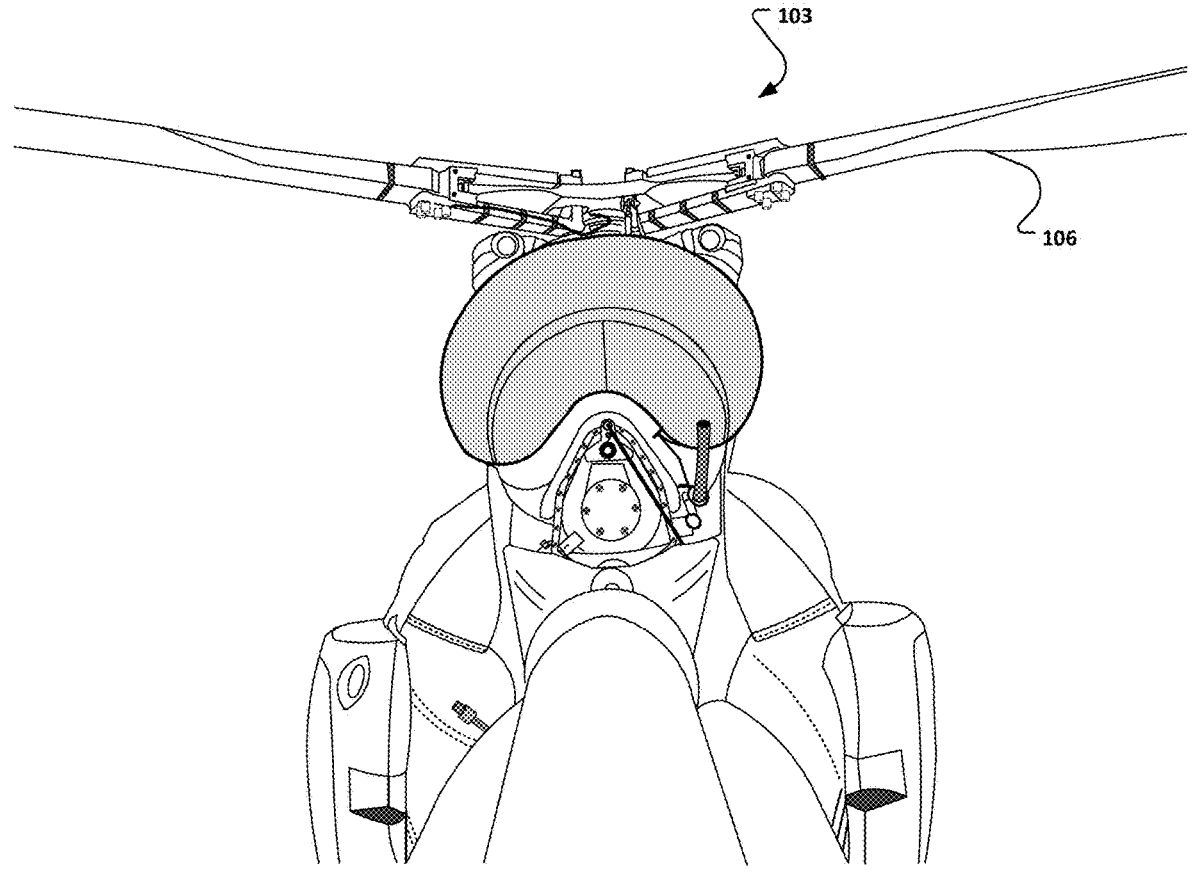
FIG. 1 depicts the prior art of a straight exhaust nozzle on a single engine helicopter.

To mitigate the effects of the exhaust gases as discussed above disclosed is a curved and bent exhaust nozzle that deflects/diverts exhaust gases to either the left hand side or right hand side (by virtual of its bent direction) of the tail boom that results in at least a significant reduction in the temperature imposed on the tail boom. Referring to FIG. 2, again is shown a helicopter 103. The straight nozzle 101 of FIG. 1 is replaced with the disclosed curved and bent deflector exhaust nozzle 105 of FIG. 2.

In this embodiment, the curved and bent deflector nozzle 105 may be a direct replacement for an existing straight nozzle 101, using the original fixing provisions. Accordingly, for the AS350 and the EC130, it is possible to replace the straight nozzle 101 of FIG. 1 with the curved and bent deflector nozzle 105 of FIG. 2. In this embodiment, such a right hand Airbus deflector nozzle 365A54-2048-02 or 365A54-2048-04 and such a left hand Airbus deflector nozzle 365A54-2048-03 or 365A54-2048-05 are only advertised and previously only certified for the left hand engines and the right hand engines of the twin engine helicopters Eurocopter AS365 Dauphin and Eurocopter EC155 but were found to be, unexpectedly, interchangeable with the straight nozzles of the AS350 and the EC130 single engine helicopters. Certification by the Australian Government Civil Aviation Safety Authority for in flight utilisation of either of the right hand Airbus deflector nozzle 365A54-2048-02 or 365A54-2048-04 for the single engine helicopters AS350, the EC130B4 and the EC130T2 has been received. Modification utilising the left hand Airbus deflector nozzle 365A54-2048-03 or 365A54-2048-05 is also approved.

Figure 2:
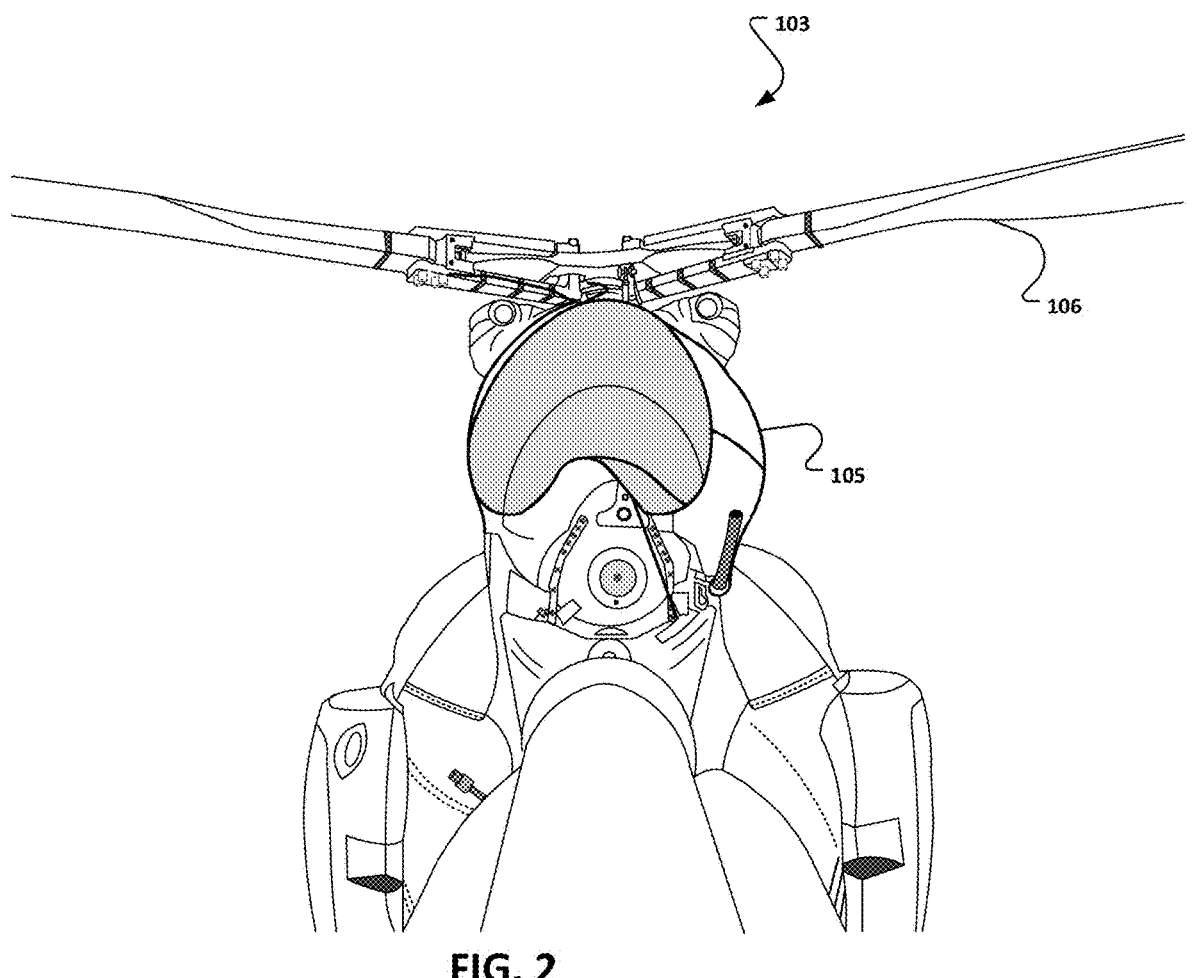
FIG. 2 depicts a disclosed curved and bent exhaust nozzle on a single engine helicopter.
Figure 5:
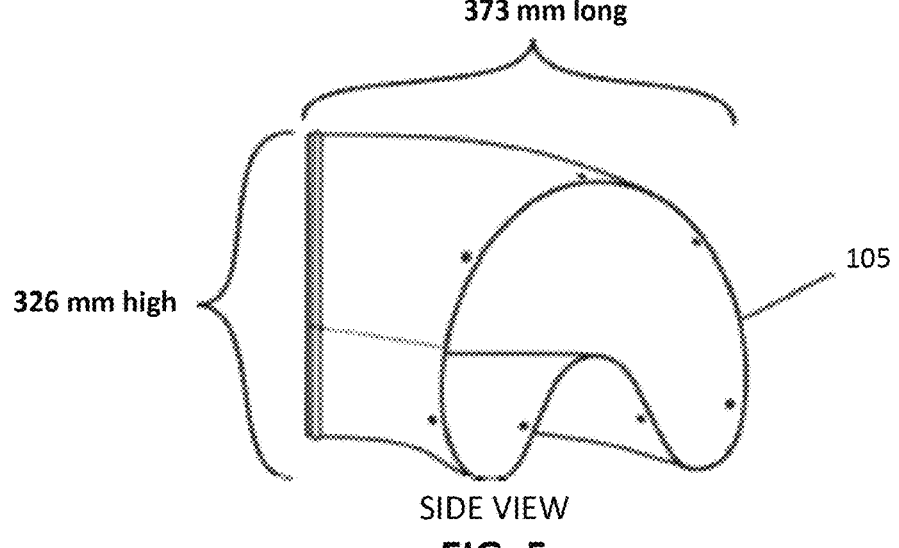
FIG. 5 depicts a side view of the disclosed deflector nozzle for a single engine helicopter.
Figure 6:
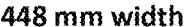
FIG. 6 depicts a rear view of the disclosed deflector nozzle for a single engine helicopter.
Figure 6:
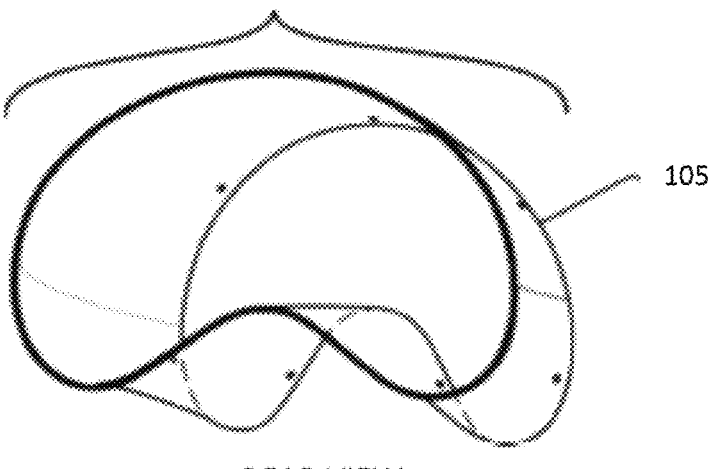
Figure 7:
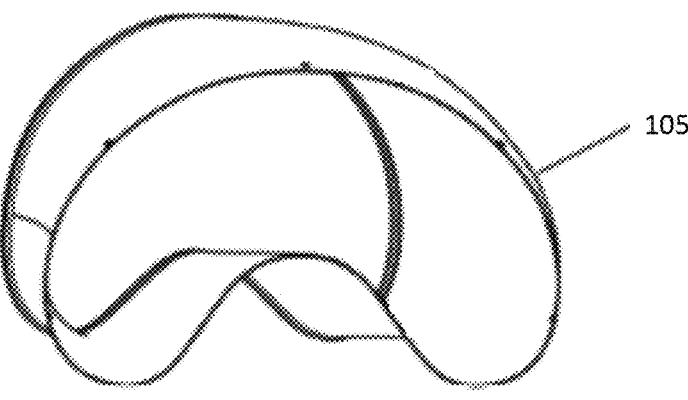
FIG. 7 depicts a front view of the disclosed deflector nozzle for a single engine helicopter.

For other single engine helicopters, utilising the right hand Airbus deflector nozzle 365A54-2048-02 or 365A54-2048-04 and such a left hand Airbus deflector nozzle 365A54-2048-03 or 365A54-2048-05 may require a specially fabricated exhaust manifold to fit and secure one of the above-referenced Airbus curve and bent deflector nozzles. In another embodiment, both the curved and bent deflector nozzles and the exhaust manifold may be fabricated to duplicate the helicopter of the present claims. The curved and bent deflector nozzle 105 of FIG. 2 is made of two formed sheet metal halves that are seam welded together, and are depicted in FIGS. 5, 6 and 7. The Airbus material tested as "Nimonic 75" (Nickel based alloy) or more likely the French equivalent "AFNOR NC20T". Alternatively, any suitable material such as "Stainless Steel 321" may be used.

Figure 3:
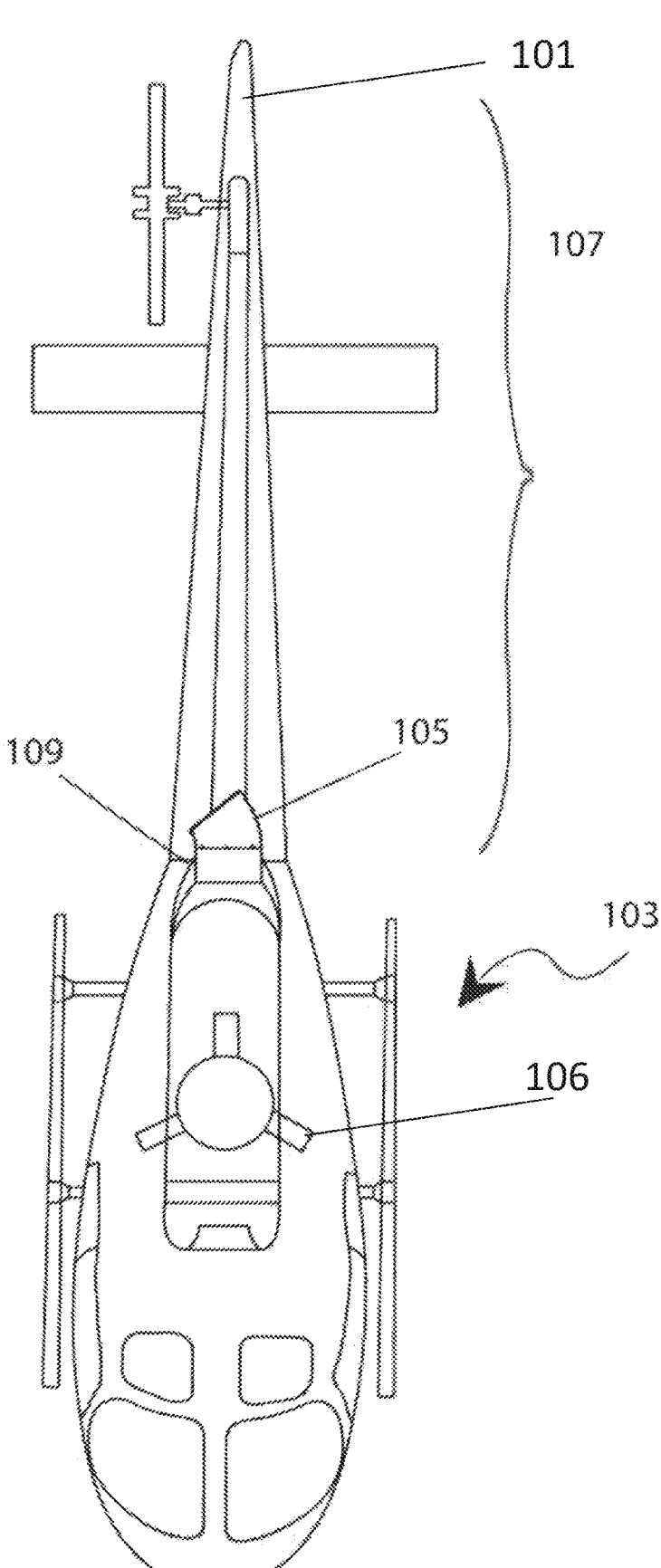
FIG. 3 depicts a top down view of a helicopter including the disclosed curved and bent exhaust nozzle attached to the exhaust manifold.

Referring to FIG. 3, a top down view of a single engine helicopter 103 is shown including a longitudinally centrally positioned single engine and a corresponding symmetrically positioned exhaust manifold 109, the disclosed curved and bent exhaust nozzle 105 is shown. The tail boom 107 is under the exhaust nozzle 105 and terminates at a terminal end of the helicopter. As discussed above, the disclosed curved and bent exhaust nozzle 105 is designed and built for the left hand engine or right hand engine of a twin engine Airbus model Eurocopter AS365 Dauphin and Eurocopter EC155. The presently repurposed curved and bent configuration of the right hand Airbus deflector nozzles 365A54-2048-02 or 365A54-2048-04 and the left hand Airbus deflector nozzles 365A54-2048-03 or 365A54-2048-05 was designed to avoid other aircraft components of the Eurocopter AS365 Dauphin and Eurocopter EC155, in particular.

The disclosed curved and bent exhaust nozzle 105, in this embodiment deflects/diverts exhaust gases to the left hand side of the helicopter by virtue of the exhaust nozzle's 105 left hand bent direction, also shown in FIG. 2. As a result of the deflected/diverted exhaust gases, the normally occurring downwash caused by the main rotor blades of the tail boom 107 during flight may not occur. The exhaust gases may bypass the tail boom 107 during flight, and therefore the tail boom 107 damage and deterioration, as described above, may not occur or it may at least be substantially less affected by the exhaust gases commingling with the downdraft air current generated by main rotor blades 106 downward onto the tail boom 107 in flight.

Figure 4:
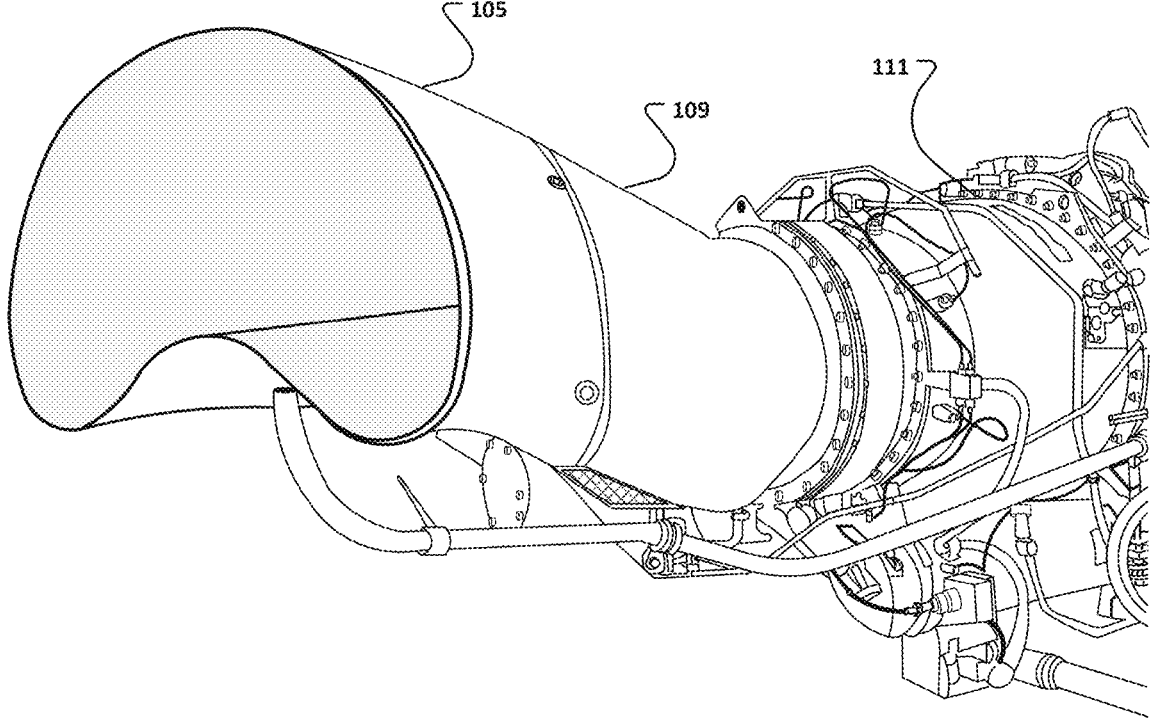
FIG. 4 depicts an isometric view of a disclosed curved and bent deflector nozzle, secured to a manifold of a helicopter's single engine.

In the embodiment shown in FIG. 3, the exhaust manifold 109 may be configured to receive the disclosed curved and bent deflector nozzle 105 either as a ready-made part or one or both being fabricated as such. Referring to FIG. 4, a curved and bent nozzle 105 is depicted as secured to the exhaust manifold 109, the deflector exhaust nozzle 105 configured to receive exhaust gases from the single engine 111 and direct the exhaust gases away from the tail boom 107.

Referring to FIGS. 5, 6 and 7, the disclosed deflector nozzle 105 is shown in a side view, a rear view and a front view. It is clear from the images that the deflector nozzle 105 is a right hand engine nozzle of the type made for a twin engine helicopter Eurocopter AS365 Dauphin and Eurocopter EC155. The curvature and the bend of the deflector nozzle 105 which is approximately forty degrees from the centre renders the disclosed single engine helicopter including a longitudinally centrally positioned single engine and a corresponding symmetrically positioned exhaust manifold and a symmetrically positioned rear tail boom, asymmetrical. A forty degrees bend from the centre of the longitudinal line of a single engine helicopter has been found to redirect the exhaust gases from the tail boom 107 in flight. Other bends and configurations may be sufficient as well. While the curved and bent deflector exhaust nozzle introduces an asymmetrical feature to the single engine helicopter, at least in this embodiment, the asymmetrical feature may be uncompensated for with, for example, added weight or air foils opposite the direction of the bend of the disclosed curved and bent deflector exhaust nozzle 105. Furthermore, in the disclosed single engine helicopter, the tail boom may be unprotected by a heat shield.

Shown in FIG. 5, Airbus deflector nozzle 365A54-2048-02 or 365A54-2048-04 and such a left hand Airbus deflector nozzle 365A54-2048-03 or 365A54-2048-05, the side view illustrates the height of 326 mm and 373 mm in length on its long side. The short side, by virtue of its bend, may be half of that, or more or less. Shown in FIG. 6, the Airbus deflector nozzle 365A54-2048-02 or 365A54-2048-04 and such a left hand Airbus deflector nozzle 365A54-2048-03 or 365A54-2048-05 is 448 mm in width.

It is understood that similarly configured curved and bent deflector exhaust nozzles 105 secured to exhaust manifolds

109 to receive exhaust gases from the engines 111 of other single engine helicopters may beneficially be uncompensated for in terms of yaw control and heat protective devices or processes. As mentioned above, the disclosed curved and bent deflector exhaust nozzle 105 for use on the AS350, the EC130B4 and the EC130T2 has been tested and certified for use in flight wherein neither yaw control compensation nor heat shields have been required.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. Devices, systems, methods of working, methods of manufacture, and various other configurations are within the scope of this disclosure. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A method of retrofitting a single engine helicopter of either Airbus models AS350 or EC130 comprising an original single straight exhaust nozzle for expelling substantially all exhaust of the single engine in the direction of s symmetrically positioned rear tail boom with a different exhaust nozzle, the tail boom terminating at a terminal end of the single engine helicopter, when the single engine helicopter is in flight, the helicopter further comprising a longitudinally centrally positioned single engine, a corresponding singled exhaust manifold that is centrally and symmetrically positioned and rear facing adjacent to the engine, wherein the single centrally and symmetrically positioned rear facing exhaust manifold is above the terminal end of the helicopter, the method for fixably securing retrofitting comprising:

without compensating for yaw on the single engine helicopter, replacing the original single substantially straight nozzle with the different nozzle by removing fixing provisions for fixing the single substantially straight nozzle to the single symmetrically positioned rear facing symmetrical exhaust manifold of the helicopter so that the fixing provisions are reusable, to then fixably secure the single exhaust manifold the different nozzle being a single asymmetrical, curved and bent deflector exhaust nozzle being of one of a right hand Airbus deflector nozzle 365A54-2048-02, a right hand Airbus deflector nozzle 365A54-2048-04, or left hand Airbus deflector nozzle 365A54-2048-03, or a left hand deflector nozzle 365A54-2048-05, by reusing the fixing provisions for fixing the single substantially straight nozzle to the single exhaust manifold of the helicopter, the asymmetrical, curved, and bent deflector exhaust nozzle being configured with a bent direction to one of a left side or a right side of the single engine helicopter above the tail boom, the single asymmetrical, curved and bent deflector exhaust nozzle being configured so as to—direct substantially all the exhaust gases through a right hand Airbus deflector nozzle 365A54-2048-02 or 356A54-2048 or a left hand Airbus deflector nozzle 365A54-2048-03 or 365A54-2048-05 in the bent direction to deflect substantially all exhaust gases to one of the left side or the right side of the helicopter above the terminal end of the single engine helicopter, in a direction both away from the tail boom and away from the main rotor blades to avoid commingling of the exhaust gases with the downwash otherwise caused by the main rotor blades onto the tail boom when the helicopter is in flight when the helicopter was equipped with the original nozzle.

2. The method of claim 1 wherein the tail boom is unprotected by a heat-shield.

3. A single engine helicopter either of the Airbus models AS350 and EC130 comprising an exhaust system comprising a rear facing symmetrical exhaust manifold and originally equipped with a single substantially straight exhaust nozzle and including a tail boom and main rotor blades at a terminal rear end of the helicopter, the rear facing symmetrical exhaust manifold adjacent to the engine to receive substantially all exhaust gases from the single engine when the helicopter is in flight and for expelling substantially all exhaust of the single engine through the originally equipped with a single substantially straight exhaust nozzle in the direction of a symmetrically positioned rear tail boom and rotor blades, the exhaust system comprising:

without compensation for yaw by control devices or processes on the single engine helicopter, another type of exhaust nozzle replaced the originally equipped single substantially straight exhaust nozzle, wherein the another type exhaust nozzle is an asymmetrically curved and bent deflector exhaust nozzle being one of a right hand Airbus deflector nozzle 365A54-2048-02 or 365A54-2048-04 or a left hand Airbus deflector nozzle 365A54-2048-03 or 365A54-2048-05 fixably secured to the single centrally and symmetrically positioned rear facing symmetrical exhaust manifold by reused fixing provisions that were removed from the manifold when the originally equipped single substantially straight exhaust nozzle was removed, the single deflector exhaust nozzle being one of a right hand Airbus deflector nozzle 365A54-2048-02 or 365A54-2048-04 or a left hand Airbus deflector nozzle 365A54-2048-03 or 365A54-2048-05 being configured to receive substantially all exhaust gases from the single exhaust manifold of the single engine when the helicopter is in flight so as to direct substantially all exhaust gases through one of a right hand Airbus deflector nozzle 365A54-2048-02 or 365A54-2048-04 or a left hand Airbus deflector nozzle 365A54-2048-03 or 365A54-2048-05 to deflect substantially all exhaust gases away from the terminal end of the helicopter, the bent direction to deflect substantially all exhaust gases to one of the left side or the right side of the helicopter above the terminal end of the single engine helicopter in a direction both away from the tail boom and away from the main rotor blades to avoid commingling of the exhaust gases with the downwash otherwise caused by the main rotor blades downward onto the tail boom when the helicopter is in flight when the helicopter was equipped with the original nozzle.

4. The helicopter of claim 3 wherein the tail boom is unprotected by a heat-shield.

* * * * *